United States Patent [19]
Kohmoto et al.

[11] Patent Number: 5,343,331
[45] Date of Patent: Aug. 30, 1994

[54] LIGHT INTERCEPTING FRAME OF LENS

[75] Inventors: Shinsuke Kohmoto; Hiroshi Nomura, both of Tokyo, Japan

[73] Assignee: Asahi Kogaku Kogyo Kabushiki Kaisha, Tokyo, Japan

[21] Appl. No.: 478,153

[22] Filed: Feb. 6, 1990

[30] Foreign Application Priority Data

Feb. 9, 1989 [JP] Japan ................ 1-14483[U]

[51] Int. Cl.$^5$ .................... G02B 7/02; G02B 27/00
[52] U.S. Cl. .................... 359/823; 359/601; 359/614
[58] Field of Search ............... 350/580, 581, 124, 311, 350/318, 247–257, ; 354/286, 195.1–195.13, 241, 403, 408, 400, 402, 407; 359/227–233, 611–615, 696–706, 735, 819–830, 600–601, 738–740

[56] References Cited

U.S. PATENT DOCUMENTS

| | | | |
|---|---|---|---|
| 1,950,166 | 3/1934 | Durholz | 359/696 |
| 3,809,459 | 5/1974 | Wakamiya et al. | 350/164 |
| 3,980,398 | 9/1976 | Revy von Belvard | 359/696 |
| 3,995,296 | 11/1976 | Nakano | 354/241 |
| 4,152,064 | 5/1979 | Hashimoto et al. | 354/286 |
| 4,183,661 | 1/1980 | Ohkura | 355/61 |
| 4,226,505 | 10/1980 | Hashimoto et al. | 350/252 |
| 4,461,547 | 7/1984 | Ikari et al. | 350/580 |
| 4,731,629 | 3/1988 | Aoshima et al. | 354/410 |
| 4,759,618 | 7/1988 | Kamata | 359/694 |
| 4,911,542 | 3/1990 | Nishio et al. | 350/429 |
| 4,964,697 | 10/1990 | Fuziwara | 359/700 |
| 4,992,819 | 2/1991 | Ohtaka et al. | 354/408 |
| 5,033,819 | 7/1991 | Tanaka | 359/738 |
| 5,034,762 | 7/1991 | Kohmoto | 354/195.12 |
| 5,170,294 | 12/1992 | Haraguchi et al. | 359/900 |

FOREIGN PATENT DOCUMENTS

| | | |
|---|---|---|
| 0182557 | 5/1986 | European Pat. Off. . |
| 2228102 | 8/1990 | European Pat. Off. ............ 359/819 |
| 2232269 | 12/1990 | European Pat. Off. ............ 359/827 |
| 1571570 | 6/1969 | France . |
| 57-187411 | 5/1981 | Japan . |
| 58-38764 | 8/1983 | Japan . |
| 59-48513 | 3/1984 | Japan . |
| 214810 | 12/1984 | Japan ............... 359/827 |
| 232409 | 10/1986 | Japan ............... 350/257 |
| 62-65010 | 3/1987 | Japan . |
| 63-160520 | 4/1987 | Japan . |
| 62-31820 | 2/1988 | Japan . |
| 0664790 | 1/1952 | United Kingdom . |
| 1467285 | 3/1977 | United Kingdom . |
| 2036498 | 6/1978 | United Kingdom . |
| 1523773 | 9/1978 | United Kingdom . |
| 2164470 | 3/1986 | United Kingdom . |
| 2229010 | 9/1990 | United Kingdom . |

OTHER PUBLICATIONS

English Language Translation of JP 62-31820.
English Language Translation of JP 57-187411.
English Language Translation of JP 62-65010.
K. Mutze, ABC of Optics, 1961, p. 143, Right Column, Paragraph R. An English Translation of the cited Passage is Included.
English Translation of the German Office Action.
United Kingdom Search Report.
English abstract of Japanese Patent No. 56066809.

*Primary Examiner*—Loha Ben
*Assistant Examiner*—Thong Nguyen
*Attorney, Agent, or Firm*—Sandler, Greenblum & Bernstein

[57] ABSTRACT

A light intercepting frame which has an opening which permits only usable light (luminous flux) to pass therethrough and which is provided on a final lens surface of a final lens of a zoom lens.

24 Claims, 2 Drawing Sheets

U.S. Patent    Aug. 30, 1994    Sheet 1 of 2    5,343,331
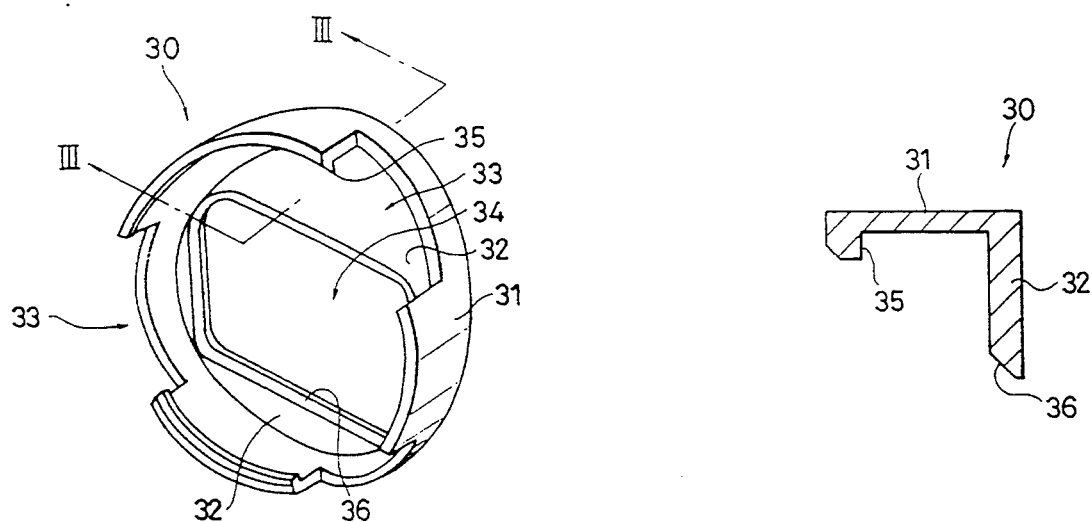
Fig.1
Fig.3
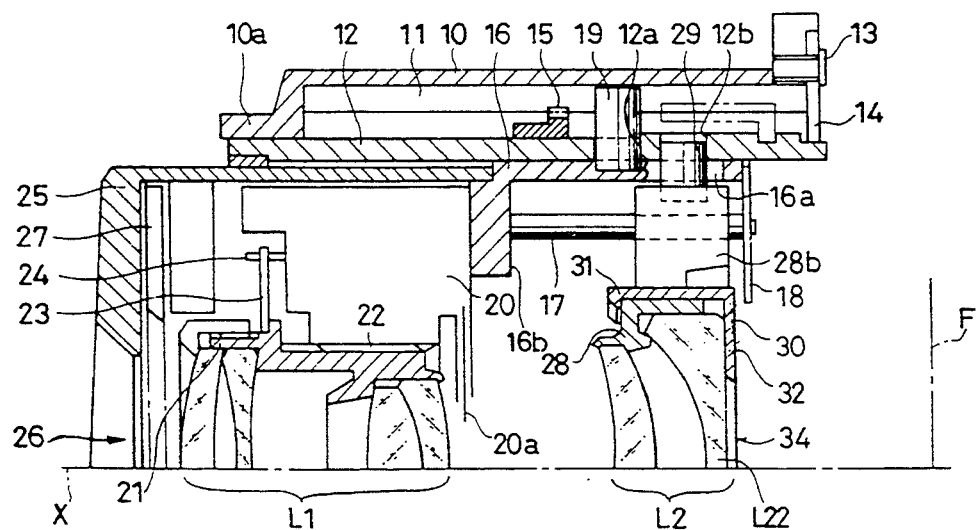
Fig.2

LIGHT INTERCEPTING FRAME OF LENS

BACKGROUND OF THE INVENTION

1. Field of the Invention

The present invention relates to a light intercepting frame of a lens and more precisely, it relates to a light intercepting frame which intercepts harmful light (luminous flux) which causes ghost or flare or the like.

2. Description of Related Art

A photographing lens unit in a presently available camera is compact but complicated in order to increase the zoom power (magnification), resulting in a complex internal construction of the lens barrel. Light incident on the lens barrel is reflected by lens surfaces, lens ends, internal surfaces of the lens barrel or other internal components in the lens barrel. The internal reflection causes ghost or flare or the like which damages the picture.

An image plane is defined by an aperture which is usually provided in the vicinity of a film plane, so that harmful light which does not define the image plane is intercepted by the aperture.

However, such harmful light (luminous flux) can not be completely eliminated by the aperture, particularly in a zoom lens in which a terminal lens moves during zooming.

Furthermore, the shape of the picture plane of the film is rectangular, whereas the photographing lens has a circular cross sectional shape. Accordingly, light incident through the upper and lower edges of the photographing lens contains harmful components (luminous flux) which do not define the image plane, resulting in a production of ghost or flare etc.

SUMMARY OF THE INVENTION

The primary object of the present invention is to provide a simple light intercepting frame which can effectively intercept harmful light which does not contribute to the image of an object to be photographed.

The inventors of the present invention have realized that a cross sectional shape of a final lens surface of a final lens which constitutes an image forming optical system, taken along a plane perpendicular to the optical axis of useful light (luminous flux) which defines an image plane should be analogous to the image plane.

According to the present invention, a light intercepting frame which has an opening which permits only the useful luminous flux to pass therethrough or which is analogous to the image plane is provided on the final lens surface of the final lens of the image forming optical system or in the vicinity thereof.

With the light intercepting frame as constructed above, light other than the useful light which forms an image of the object can be effectively intercepted at the final lens surface of the final lens of the image forming optical system or in the vicinity thereof. Thus, flare or ghost which would otherwise be caused by the internal reflection, does not occur.

In case of a zoom lens in which the final lens constitutes one of the variable power lenses, according to another aspect of the present invention, a radially extending light intercepting frame is provide on the final lens surface of the final lens on the image of the object side to come into close contact therewith or in the vicinity thereof. In this alternative, preferably, the light intercepting frame has a center opening analogous to the image plane.

With this arrangement, since the light intercepting frame moves together with the variable power lenses, harmful light can be always be intercepted at the final lens surface of the final lens or the vicinity thereof.

BRIEF DESCRIPTION OF THE DRAWINGS

The invention will be described below in detail with reference to the accompanying drawings, in which:

FIG. 1 is a perspective view of a light intercepting frame according to an embodiment of the present invention;

FIG. 2 is a longitudinal sectional view of an upper half of a zoom lens to which the present invention is applied, taken along a plane including an optical axis thereof;

FIG. 3 is a sectional view taken along the line III-—III in FIG. 1; and,

DESCRIPTION OF PREFERRED EMBODIMENT

Figure 4:
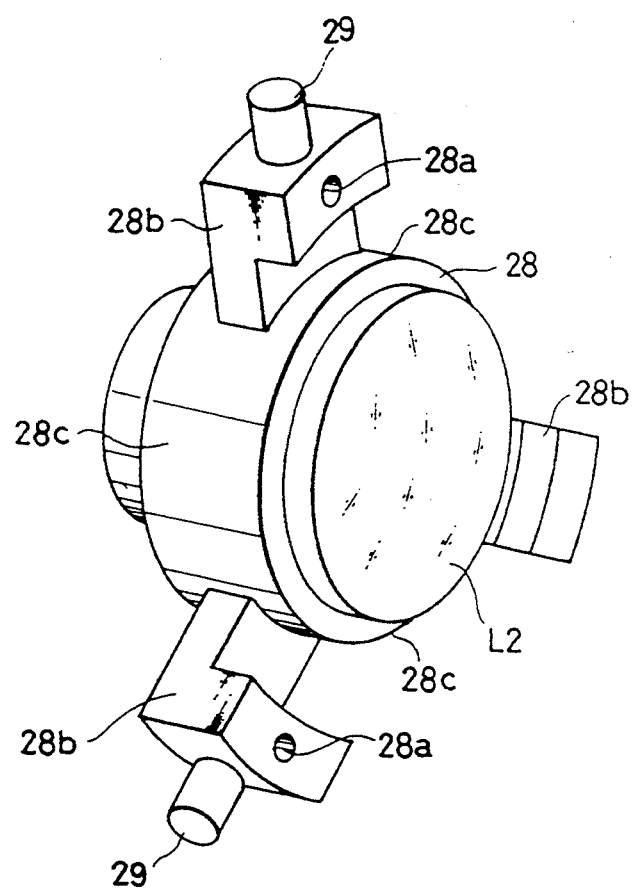
FIG. 4 is a perspective view of a rear lens group supporting frame of a zoom lens to which a light intercepting frame according to the present invention is mounted.

In the illustrated embodiment, a zoom lens to which the embodiment is applied is secured to a camera body (not shown) through an outermost housing 10. On the inner peripheral surface of the housing 10 are formed linear guide grooves 11 which extend in parallel with the optical axis X.

A cam ring 12 which rotates without moving in the axial direction is housed in the housing 10. The cam ring 12 is rotatably supported, at its front end by a small diameter portion 10a of the housing 10, and at the rear end thereof by a supporting plate 14 which is secured to the housing 10 by screws 13 (only one screw is shown in FIG. 2).

The cam ring 12 has cam grooves 12a (front lens cam grooves) for the front lens group and cam grooves 12b (rear lens cam grooves) for the rear lens group. A sector gear 15 is secured to the outer peripheral surface of the cam ring 12. The sector gear 15 is engaged by a pinion of a zoom motor (not shown), so that the cam ring 12 is rotated by the zoom motor.

A slide ring 16 is located in the cam ring 12 so as to slide in the axial directions. The slide ring 16 is provided on its front end with a radially extending flange portion 16b to which three guide rods 17 (only one guide rod is shown) are secured. The guide rods 17 are spaced from one another at a predetermined angular distance and extend in parallel with the optical axis X. The guide rods 17 are secured at their rear ends to a light intercepting plate 18 which is in turn secured to the rear end of the slide ring 16, so that the guide rods move together with the slide ring 16 in the optical axis directions.

The slide ring 16 is provided with cam pins 19 (rear lens cam pins) for the rear lens group. The rear lens cam pins 19 extend through the front lens cam grooves 12a of the cam ring 12, so that the upper ends thereof are fitted in the associated linear guide grooves 11. Consequently, when the cam ring 12 rotates, the slide ring 16 moves in the optical axis directions along the cam profile of the front lens cam grooves 12a without rotating. The rotation of the slide ring 16 is prevented by the linear guide grooves 11.

To the front end of the slide ring 16 is secured a shutter block 20 known per se, which has shutter blades 20a. A front lens group supporting frame 21 which supports the front lens group L1 is supported in the shutter block 20 through a helicoid 22.

The front lens group supporting frame 21 has a connecting plate 23 connected thereto, which extends in the radial directions and which is engaged by a focus adjusting rod 24 projecting from the front face of the shutter block 20. The focus adjusting rod 24 which extends in the optical axis direction is circumferentially rotated by a pulse motor (not shown) incorporated in the shutter block 20 to rotate the front lens group supporting frame 21 through the connecting plate 23, so that the front lens group L1 can be moved in the optical axis directions in accordance with the lead of the helicoid 22 to complete the focusing.

On the outer periphery of the shutter block 20 is provided a decorative ring 25 which has a lens aperture 26 formed on the front end thereof. A barrier 27 is provided behind the lens aperture 26 to open and close the same.

A rear lens group supporting frame 28 which supports the rear lens group L2 is slidably supported by the guide rods 17. The rear lens group supporting frame 28 has three leg portions 28b which have through holes 28a in which the guide rods 17 and cam pins 29 are inserted as shown in FIG. 4.

The cam pins 29 extend through linear guide grooves 16a formed in the slide ring 16 in parallel with the optical axis X to be fitted in the corresponding rear lens cam grooves 12b of the cam ring 12. Thus, when the cam ring 12 rotates, the rear lens group supporting frame 28, and accordingly the rear lens group L2 is moved in the optical axis directions along the guide rods 17 in accordance with the profile of the rear lens cam grooves 12b without rotating. Also, the rotation of the cam ring 12 causes the front lens group L1 to move along the linear guide grooves 11 in accordance with the profile of the front lens cam grooves 12a without rotating, so that a spatial distance between the front lens group L1 and the rear lens group L2 varies while keeping a predetermined relationship to vary the focal length (angle of view).

The following description will be directed to a light intercepting frame 30 which is one of the most significant features of the present invention, with reference to FIGS. 1, 3 and 4.

The light intercepting frame 30 is mounted to the rear lens group supporting frame 28 which supports the rear lens group L2 including the final lens L22 on the object image side (i.e. on the film F side) to move together in the optical axis direction without rotating. The light intercepting frame 30 has an annular body portion 31 fitted on the rear lens group supporting frame 28 and a light intercepting wall 32 which extends inwardly (radially) from the rear end of the annular body 31, as shown in FIG. 1. The annular body portion 31 is provided with three axially extending recesses (cut away portions) 33 which are spaced from one another at a predetermined angular distance. The light intercepting wall 32 has at its center an opening 34 which permits only useful light (luminous flux) to pass therethrough.

The recesses 33 permit the rear lens group supporting frame 28 to be fitted in the light intercepting frame 30, so that the leg portions 28b are fitted in the associated recesses 33. Namely, when the light intercepting frame 30 is fitted on the rear lens group supporting frame 28, the leg portions 28b of the rear lens group supporting frame 28 project outward through the corresponding recesses 33. The annular body portion 31 is provided on its front end with an inwardly and radially extending abutment (projection) 35 which comes into engagement with the rear lens group supporting frame 28 to firmly hold the final lens L22 of the rear lens group L2 between the rear lens group supporting frame 28 and the light intercepting wall 32.

The opening 34 of the light intercepting frame 30 has a contour corresponding to the profile of usable light (luminous flux) which defines an image plane, so that the opening 34 is substantially analogous to the image plane. The opening 34 permits only the usable light (luminous flux), which defines the image plane, among luminous flux transmitted through the rear lens group L2, to pass through the opening 34, so that light (luminous flux) which does not contribute to a formation of the image plane can be intercepted. Namely, the non-usable luminous flux is absorbed by the light intercepting wall 32 of the light intercepting frame 30, and accordingly, no harmful light reaches the film F.

The opening 34 formed in the light intercepting frame 30 has a peripheral tapered edge 36 which gradually decreases in diameter toward the front end thereof (i.e. toward the film F), as can be seen in FIG. 3.

Due to the tapered edge 36 which defines the opening 34, the possibility of reflection of light at the peripheral edge of the opening 34 can be minimized. The surfaces of the light intercepting wall 32 and the tapered edge 36 are subject to an anti-reflection treatment. Preferably, the tapered edge 36 is formed along the whole periphery of the opening 34 having a shape corresponding to the shape of the image plane, but when the opening 34 is rectangular, as in the illustrated embodiment, the tapered edge 36 can be formed only on the center portions of the longer sides of the rectangular opening 34, since there is a larger amount of non-usuable light at the center portions of the longer sides of the rectangular opening 34. Note that there is no limitation on the shape of the edge 36.

The light intercepting wall 32 is located on the final lens surface of the final lens L22 closer to the film F, in close contact therewith. Alternatively, it is also possible to provide the light intercepting wall 32 in the vicinity of the final lens surface without contacting therewith.

As can be understood from the foregoing, according to the present invention, light which enters the lens aperture 26 to be incident on the rear lens group L2, which is not usable collides with the light intercepting wall 32 or the tapered edge 36 to be absorbed thereby. Thus, no light not usable to form the image reaches the film F.

Furthermore, according to the illustrated embodiment, since the light intercepting frame 30 moves together with the rear lens group L2, non-useable light can be intercepted by the light intercepting frame, regardless of the focal length.

Although the above discussion has been directed to a zoom lens having two lens groups of, the front lens group L1 and the rear lens group L2, the present invention is not limited thereto. Namely, the present invention can be applied to any type of lens arrangement.

In the illustrated embodiment, although the light intercepting frame 30 including the walls 32, is formed integrally with the rear lens group supporting frame 28, the light intercepting frame 30 can be formed separately therefrom.

As can be seen from the above discussion, according to the present invention, light which causes ghost or flare or the like can be effectively intercepted by a light intercepting frame which is located on the final lens surface of the photographing optical system or the vicinity thereof. Only usable light can be focused in an image plane, through the opening of the light intercepting frame, analogous to the shape of the image plane, regardless of the focal length. Thus, neither flare nor ghost, due to the internal reflection occurs.

We claim:

1. A light intercepting frame of a photographing optical device including an image forming optical system, said image forming optical system including a final lens and means for moving said final lens along an optical axis of the image forming optical system, said frame comprising a light intercepting wall which is located in the vicinity of a final lens surface of the final lens of the image forming optical system for movement together with said final lens, and which has an opening which has a predetermined shape to form a shape of a profile of usable light which is transmitted through said final lens to define an imaged area, and an annular portion extending from said light intercepting wall in a direction transverse to said light intercepting wall, said annular portion encompassing a periphery of said final lens and including at least one cut-out portion permitting accommodation of a lens supporting structure for said final lens.

2. A light intercepting frame according to claim 1, wherein said light intercepting wall is movable along the optical axis of the image forming optical system together with the final lens of the image forming optical system without rotating.

3. A light intercepting frame according to claim 1, wherein said predetermined shape of said opening is substantially analogous to a shape of an image to be formed on the image plane.

4. A light intercepting frame according to claim 1, wherein said opening of the light intercepting wall is defined by a tapered peripheral edge.

5. A light intercepting frame according to claim 4, wherein said tapered peripheral edge is formed to thin toward said opening.

6. A light intercepting frame according to claim 4, wherein a shape of an image to be formed on the image plane and the opening of said light intercepting wall are rectangular and wherein the rectangular opening of said light intercepting wall is defined by a tapered peripheral edge which is provided at least on parts of the longer sides of the rectangle.

7. A light intercepting frame according to claim 4, wherein said light intercepting wall and said edge of the opening are subjected to an antireflection surface treatment.

8. A light intercepting frame according to claim 1, wherein said light intercepting wall can be integrally formed with a lens frame which supports the final lens constituting the image forming optical system.

9. A light intercepting frame according to claim 1, wherein said image forming optical system has a lens aperture which defines an image plane behind the final lens surface, so that said light intercepting wall is located between the image plane and the lens aperture.

10. A light intercepting frame according to claim 1, wherein said final lens is one of a plurality of lenses comprising the image forming optical system, said image forming optical system comprising a zoom lens.

11. A light intercepting frame according to claim 10, wherein said light intercepting wall is in contact with the final lens surface of the final lens.

12. The light intercepting frame according to claim 1, a periphery of said opening of said light intercepting wall having, in a direction extending towards the final lens surface of the final lens, a taper extending away from the optical axis of the image forming optical system.

13. The light intercepting frame according to claim 1, further comprising means for retaining said final lens and at least one additional lens of said image forming optical system.

14. The light intercepting frame according to claim 1, said annular portion being removably attachable to said lens frame supporting structure of said final lens of the image forming optical system.

15. A light intercepting frame according to claim 14, wherein said light intercepting wall is integrally formed with said annular portion.

16. A light intercepting frame of a photographing optical device, including an image forming optical system, said image forming optical system including a final lens, said frame comprising a light intercepting wall which is in contact with a final lens surface of the final lens of a zoom lens said light intercepting wall extending radially and inwardly to define a center opening having a shape analogous to a shape of an image to be formed on an image plane, and an annular portion extending transversely to said light intercepting wall, encompassing a periphery of the final lens, and including at least one cut-out portion permitting accommodation of a lens supporting structure of the final lens.

17. The light intercepting frame according to claim 16, further comprising means for moving the final lens along an optical axis of the image forming optical system, wherein said light intercepting wall is mounted to and for movement together with said final lens.

18. The light intercepting frame according to claim 16, wherein said light intercepting wall is fixedly positioned with respect to said final lens.

19. The light intercepting frame according to claim 16, said light intercepting wall being provided with an anti-reflection treatment.

20. The light intercepting frame according to claim 16, a periphery of said center opening of said light intercepting wall having, in a direction extending towards said final lens surface, a taper extending in a direction away from an optical axis of the zoom lens.

21. The light intercepting frame according to claim 16, further comprising means for retaining said final lens and at least one additional lens of the zoom lens.

22. A light intercepting frame of a photographing optical device including an image forming optical system, said image forming optical system including a final lens and means for moving said final lens along an optical axis of the image forming optical system, said frame located in the vicinity of a final lens surface of the image forming optical system and has an opening which has a size to permit only usable light which defines an image on an image plane to pass therethrough, said light intercepting frame intercepting light which does not define an image on the image plane, said frame being movable together with said image forming optical system and including an annular member extending in a direction transverse to the optical axis of the image forming optical system, encompassing a periphery of at least one lens of the image forming optical system and including at least one cut-out portion permitting accommodation of a lens supporting structure of said at least one lens of the image forming optical system.

23. The light intercepting frame according to claim 22, a periphery of said opening of said frame having, in a direction extending towards said final lens surface, a taper extending away from the optical axis of the image forming optical system.

24. The light intercepting frame according to claim 22 further comprising means for retaining a final lens and at least one additional lens of the image forming optical system.

* * * * *